United States Patent
Bode et al.

[11] Patent Number: 5,874,153
[45] Date of Patent: Feb. 23, 1999

[54] ZEOLITE-COATABLE METALLIC FOIL PROCESS FOR PRODUCING THE METALLIC FOIL

[75] Inventors: Hans Bode, Remscheid; Henry Pusch, Wuppertal, both of Germany

[73] Assignee: Emitec Gesellschaft fuer Emissionstechnologie mbH, Lohmar, Germany

[21] Appl. No.: 689,094

[22] Filed: Aug. 5, 1996

Related U.S. Application Data

[63] Continuation of PCT/EP95/00337 Jan. 31, 1995.

[51] Int. Cl.$^6$ .................................................. B32B 3/12
[52] U.S. Cl. .................... 428/116; 427/318; 427/419.2; 428/118; 428/469; 428/472; 428/697; 428/699; 428/701; 428/702
[58] Field of Search ................................ 428/116, 118, 428/469, 472, 697, 699, 701, 702; 427/318, 419.2

[56] References Cited

U.S. PATENT DOCUMENTS

| | | | |
|---|---|---|---|
| 3,903,341 | 9/1975 | Gerhold | 428/118 X |
| 4,247,422 | 1/1981 | Davies | 502/314 |
| 4,293,447 | 10/1981 | Inaba et al. | 502/350 |
| 5,114,901 | 5/1992 | Tsang et al. | 428/116 X |
| 5,120,694 | 6/1992 | Dunne et al. | 502/68 |
| 5,571,485 | 11/1996 | Brunson | 428/577 X |

FOREIGN PATENT DOCUMENTS

| | | |
|---|---|---|
| 0 036 938 A2 | 10/1981 | European Pat. Off. . |
| 2 232 793 A1 | 8/1987 | European Pat. Off. . |
| 0 254 818 A2 | 2/1988 | European Pat. Off. . |
| 0 283 910 A2 | 9/1988 | European Pat. Off. . |
| 0 592 667 A1 | 4/1994 | European Pat. Off. . |
| 36 00 043 A1 | 9/1987 | Germany . |
| 1 531 134 | 11/1978 | United Kingdom . |

*Primary Examiner*—Henry F. Epstein
*Attorney, Agent, or Firm*—Herbert L. Lerner; Laurence A. Greenberg

[57] ABSTRACT

A zeolite-coatable metallic foil, in particular in the form of a honeycomb body, is formed of a steel containing chromium and/or aluminum and having a surface. An oxide layer covers the surface. A ceramic washcoat on the oxide layer acts as a bonding layer for receiving a zeolite layer. A process for producing a metallic foil coated with zeolite, in particular in the form of a honeycomb body, includes oxidizing a steel foil containing chromium and/or aluminum to form a finely grained aluminum oxide layer on a surface. A ceramic washcoat acting as a bonding layer is applied to the oxide layer. A zeolite layer is applied to the ceramic bonding layer.

40 Claims, 2 Drawing Sheets

ZEOLITE-COATABLE METALLIC FOIL PROCESS FOR PRODUCING THE METALLIC FOIL

CROSS-REFERENCE TO RELATED APPLICATION

This application is a Continuation of International Application Ser. No. PCT/EP95/00337, filed Jan. 31, 1995.

BACKGROUND OF THE INVENTION

FIELD OF THE INVENTION

The present invention relates to a zeolite-coatable metallic foil and to a process for producing a zeolite-coated foil.

Zeolites are specially composed and treated ceramic materials that have particular absorption properties for certain substances because of their composition and their structure. Typically, zeolites in a low temperature range can store large quantities of gaseous substances that they give up again at a higher temperature.

Concepts exist for utilizing those properties of zeolites, for instance in order to store hydrocarbons produced in the exhaust system of a motor vehicle in the cold-starting phase until a downstream catalytic converter is warm enough to convert those substances. After the exhaust system has heated up to a certain extent, the hydrocarbons are given up by the zeolite and are oxidized in the downstream catalytic converter, producing water and carbon dioxide.

In the case of such applications and similar ones, zeolites are applied especially as coatings to honeycomb bodies through which an exhaust gas can flow. Due to the ceramic composition of the zeolites, ceramic honeycomb bodies were first used as carriers for them. However, an attempt was also made to use metal honeycomb bodies, for instance of special steel, as carriers and to coat them with zeolite. However, under severe alternating thermal strains, such as occur in the exhaust systems of motor vehicles, for instance, high adhesion strength of the coating is important, and the different coefficients of expansion of metal and ceramic materials must be taken into account.

SUMMARY OF THE INVENTION

It is accordingly an object of the invention to provide a zeolite-coatable metallic foil and a process for producing the metallic foil, which overcome the hereinafore-mentioned disadvantages of the heretofore-known devices and methods of this general type and in which a zeolite coating having an arbitrary thickness can be secured durably on the foil. In particular, it is an object to create the possibility of pretreating a metal honeycomb body after it has been manufactured and coating it with a zeolite.

With the foregoing and other objects in view there is provided, in accordance with the invention, a zeolite-coatable metallic layer, in particular in the form of a honeycomb body, comprising a foil being formed of a steel containing at least one of chromium and aluminum and having a surface; an oxide layer covering the surface; and a ceramic washcoat on the oxide layer acting as a bonding layer for receiving a zeolite layer.

A foil equipped with an oxide layer and a bonding layer forms a ceramic structure on the outside, that can be coated in a known manner with zeolite, like ceramic honeycomb bodies, which was previously not possible for metallic carrier bodies and metallic foils. Additionally, a zeolite layer can also contain catalytically active material, in particular special metals, or can be laden with them afterward, without any disadvantages. Such combination layers may even be especially effective in exhaust gas cleaning systems.

In accordance with another feature of the invention, the foil is formed of high-temperature-proof and corrosion-proof steel, which contains more than 3.5% aluminum and more than 15% chromium, and in particular approximately 5% aluminum and approximately 20% chromium are especially suitable for the present purpose.

In accordance with a further feature of the invention, a finely grained aluminum oxide layer with only slight proportions of chromium oxide and iron oxide, or none at all, is produced on the steel. This is described below in further detail in conjunction with the exemplary embodiments and the drawings. This can in particular be done by slow annealing in atmosphere.

In accordance with an added feature of the invention, the oxide layer has a mean surface roughness (mean roughness index $R_a$) of 2 to 4 $\mu$m, preferably 3 $\mu$m, and has an averaged peak-to-valley height $R_z$ of at least 0.2 $\mu$m.

In accordance with an additional feature of the invention, the ceramic bonding layer on the oxide layer is based on aluminum oxide, can be applied by a sol-gel immersion process and substantially contains $\gamma$-$Al_2O_3$.

In accordance with yet another feature of the invention, a preferred layer thickness for the ceramic bonding layer is 1–5 $\mu$m, in particular approximately 2 $\mu$m.

In accordance with yet a further feature of the invention, the bonding layer is intended to have a specific surface area of 100 to 200 $m^2$/g, preferably approximately 180 $m^2$/g.

In accordance with yet an added feature of the invention, the foil is shaped into a honeycomb body having contact points prior to being coated, and at least some of the contact points are brazed.

One substantial advantage of the present invention is that first the surface of a metallic foil is pretreated in such a way that a very uniform and finely grained oxide layer, substantially an aluminum oxide layer, is formed. However, it has been demonstrated that a zeolite layer cannot be applied to this layer directly with great adhesive strength, since the oxide layer and zeolite layer have overly different properties and structures. According to the invention, a ceramic washcoat can be used in this case as the bonding layer. This washcoat adheres especially well to the prepared oxide layer on one hand, but on the other hand has a greater similarity with the zeolite layer to be applied, so that the adhesion of the zeolite layer to the bonding layer also meets stringent demands. In particular, the bonding layer can also be altered by calcining after being applied, so as to additionally improve the adhesion conditions for the zeolite layer to be applied later.

As the process steps described below will also make clear, the layer thicknesses and surface property as well as the composition of the zeolite coating are of significance for the later adhesion strength, particularly under thermal alternating strains. For example, a thin oxide layer brings about good heat transfer between a metallic layer and a ceramic layer.

With the objects of the invention in view there is also provided a process for producing a metallic foil coated with zeolite, in particular in the form of a honeycomb body, which comprises oxidizing a steel foil containing at least one of chromium and aluminum to form a finely grained aluminum oxide layer on a surface; applying a ceramic washcoat acting as a bonding layer to the oxide layer; and applying a zeolite layer to the ceramic bonding layer.

In accordance with another mode of the invention, the steel is a high-temperature-proof and corrosion-proof steel, for instance with approximately 5% aluminum and approximately 20% chromium, which can be provided with an especially finely grained aluminum oxide layer through the use of treatment for multiple hours at a temperature of approximately 950° C. The surface of such a foil is shown in the drawings and described below in an outset state, after an annealing time of 5 hours, after an annealing time of 24 hours and after an annealing time of 48 hours, at an annealing temperature of 950° C. in a normal atmosphere. What develops is a layer that is almost entirely formed of pure aluminum oxide, without substantial proportions of chromium or iron. The surface becomes very finely grained and has a mean surface roughness of approximately 3 $\mu$m and an average peak to valley height of at least 0.2 $\mu$m. A ceramic washcoat can be especially firmly anchored in such a surface.

In accordance with a further mode of the invention, the aluminum oxide-based washcoat is applied by a sol-gel immersion process that is known per se. In particular, an aluminum oxide sol with a solid proportion of approximately 10% (weight %) is used. The thus-applied bonding layer is calcined, after the immersion process, for approximately 3 hours at a temperature of 500° C. to 650° C., preferably 550° C., and is substantially is formed of $\gamma$-$Al_2O_3$.

In accordance with an added mode of the invention, the zeolite layer is likewise applied through the use of a sol-gel immersion process. It is especially advantageous if this layer also contains from 10% to 30% and preferably approximately 20% (mass %) aluminum oxide in addition to zeolite material.

In accordance with an additional mode of the invention, the zeolite is applied in an $NH_4^+$ or $H^+$ form, which is produced in a known manner by ion exchange.

In accordance with yet another mode of the invention, the zeolite to be applied is bound, after homogenization of the mixture by grinding for multiple hours in a colloid mill, into a ceramic matrix that preferably is formed of a sol based on aluminum oxide.

The application of the process described above to completely produced honeycomb bodies made of steel foils is especially appropriate. These honeycomb bodies can be layered, wound or otherwise intertwined from foils, at least some of which are structured. Typically, such honeycomb bodies include alternatingly disposed layers of smooth and corrugated steel sheets and form flow channels through which an exhaust gas can flow. If such honeycomb bodies are immersion-coated by the sol-gel process, then large amounts of coating material remain stuck to the sides of the channels and must be removed. The state of the art is aware of the method of blowing the material out with compressed air for that purpose, but it is difficult to achieve highly uniform layer thicknesses in that way.

In accordance with yet a further mode of the invention, the excess coating material is eliminated after the coating process by centrifuging the honeycomb body, in which process the flow channels should be located radially from the axis of the centrifuge. In order to provide an especially uniform layer thickness, the centrifuging should be carried out successively in the direction of the two end surfaces, for which purpose the honeycomb body must be inverted 180° after the first centrifuging operation.

While the first chosen layer thickness, for instance of 2 $\mu$m, remains unaltered for the bonding layer, the thickness of the zeolite coating can be increased by repeating the process of coating with zeolite, namely the process of coating, centrifuging and calcining, twice or more. In this way, approximately 15 $\mu$m of zeolite can be applied per repeated coating operation.

In accordance with a concomitant mode of the invention, a proportion of zeolite of at least 30 g/m$^2$ of carrier surface area is applied to the honeycomb body.

It is understood that typical processing steps, such as drying of applied coatings before the calcining, are also advantageous in the present invention in order to avoid drying cracks and the like.

Other features which are considered as characteristic for the invention are set forth in the appended claims.

Although the invention is illustrated and described herein as embodied in a zeolite-coatable metallic foil and a process for producing the metallic foil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail and first, particularly, to FIGS. 1a–1d thereof, there is seen a surface of a high-temperature-proof and corrosion-proof steel foil, for instance with approximately 5% aluminum and approximately 20% chromium, which can be provided with an especially finely grained aluminum oxide layer by treatment for multiple hours at a temperature of approximately 950° C. FIGS. 1a–1d show the surface of such a foil in an initial or outset state in FIG. 1a, after an annealing time of 5 hours in FIG. 1b, after an annealing time of 24 hours in FIG. 1c, and after an annealing time of 48 hours in FIG. 1d, at an annealing temperature of 950° C. in a normal atmosphere. The layer that develops is almost entirely formed of pure aluminum oxide, without substantial proportions of chromium or iron. The surface becomes very finely grained and has a mean surface roughness of approximately 3 $\mu$m and an average peak to valley height of at least 0.2 $\mu$m. A ceramic washcoat can be especially firmly anchored in such a surface.

Figure 1A:
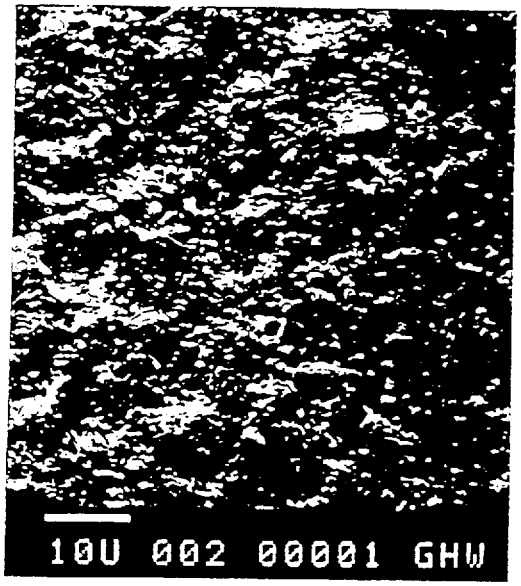
FIGS. 1a–1d are illustrations of various stages in the process of oxidation of a special steel foil.
Figure 1B:
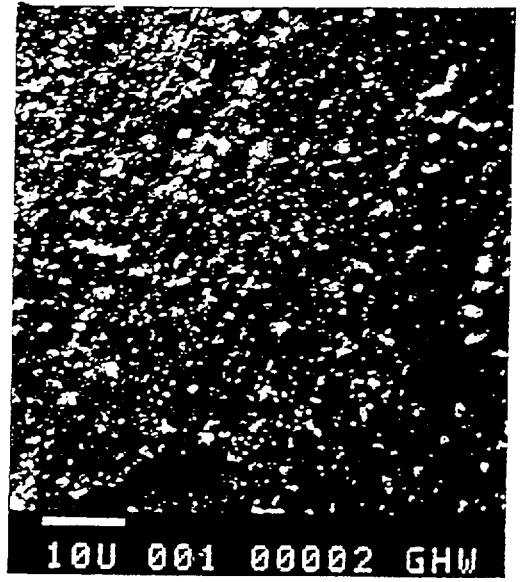
Figure 1C:
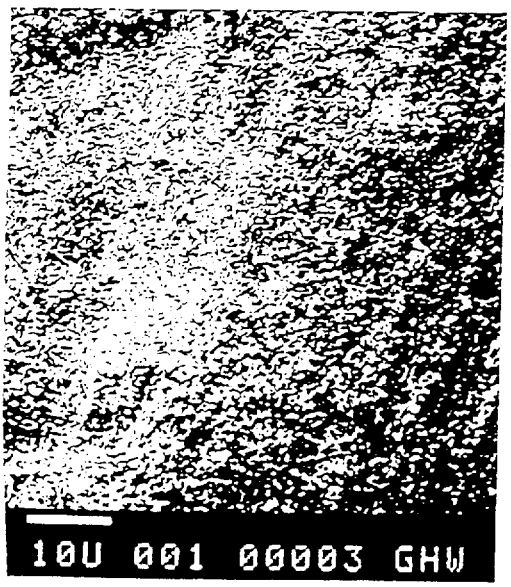
Figure 1D:
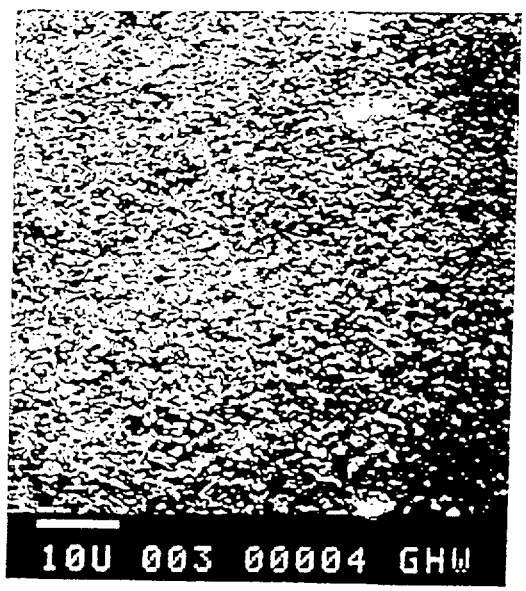
Figure 2:
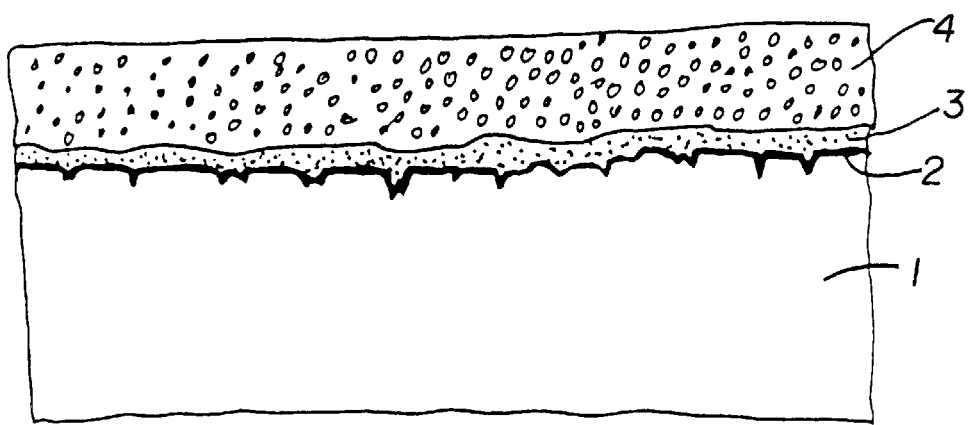
FIG. 2 is a fragmentary, diagrammatic, cross-sectional view showing the structure of a zeolite-coated foil produced according to the invention.

In FIG. 2, which is not to scale, a metallic foil 1 is provided with an oxide layer 2, a ceramic intermediate bonding layer 3, and a zeolite layer 4. As is diagrammatically shown, in a sense the bonding layer 3 is mechanically braced with the metallic foil 1 by the oxide layer 2, while the adhesion between the bonding layer 3 and the zeolite layer 4 arises from the very similar material composition of the latter layers and the attendant forces of adhesion.

Figure 3:
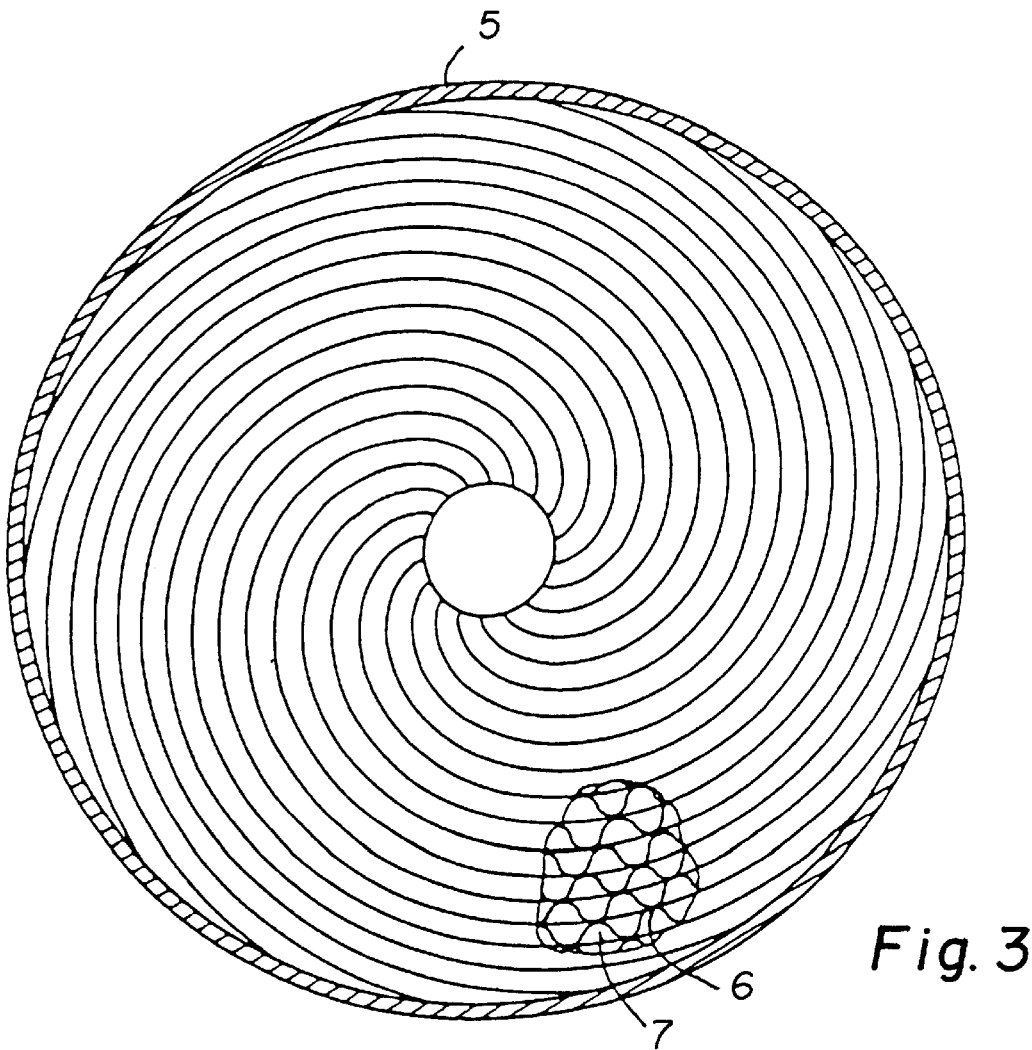
FIG. 3 is a cross-sectional view of a typical metal honeycomb body.

FIG. 3 shows a cross section through a typical honeycomb body 5 made up of smooth and corrugated metal sheets, which is joined at locations where the sheets contact one another, by brazed locations 6. In this way, channels or cells 7 through which gas can flow are formed.

Honeycomb bodies that are coated with zeolite by the process of the invention are especially suitable for exhaust gas cleaning in motor vehicles having internal combustion engines, in the cold-starting phase.

We claim:

1. A zeolite-coated metallic layer, comprising:
    a foil being formed of a steel composition containing at least one of chromium and aluminum and having a surface;
    an oxide layer covering said surface, said oxide layer being a finely grained aluminum oxide layer with at most slight proportions of chromium oxide and iron oxide, and said oxide layer having a mean surface roughness of 2 to 4 $\mu$m, and an averaged peak-to-valley height of at least 0.2 $\mu$m;
    a ceramic washcoat on said oxide layer;
    a zeolite layer disposed on said ceramic washcoat wherein said ceramic washcoat being a bonding layer for receiving said zeolite layer.

2. The layer according to claim 1, wherein said foil is formed of high-temperature-proof and corrosion-proof steel.

3. The layer according to claim 2, wherein said steel composition contains more than 3.5% aluminum and more than 15% chromium.

4. The layer according to claim 2, wherein said steel composition contains approximately 5% aluminum and approximately 20% chromium.

5. The layer according to claim 1, wherein said oxide layer is a finely grained aluminum oxide layer with no chromium oxide and iron oxide content.

6. The layer according to claim 5, wherein said ceramic bonding layer has a specific surface area of from 100 to 200 m$^2$/g.

7. The layer according to claim 5, wherein said ceramic bonding layer has a specific surface area of approximately 180 m$^2$/g.

8. The layer according to claim 1, wherein said oxide layer is a finely grained aluminum oxide layer with only slight proportions of chromium oxide and iron oxide.

9. The layer according to claim 1, wherein said oxide layer is a finely grained aluminum oxide layer with no chromium oxide and iron oxide content and is produced by slow annealing in an atmosphere.

10. The layer according to claim 1, wherein said oxide layer is a finely grained aluminum oxide layer with only slight proportions of chromium oxide and iron oxide and is produced by slow annealing in an atmosphere.

11. The layer according to claim 1, wherein said oxide layer has a mean surface roughness of 3 $\mu$m.

12. The layer according to claim 1, wherein said ceramic bonding layer is based on aluminum oxide and is applied by a sol-gel immersion process and substantially contains $\gamma$Al$_2$O$_3$.

13. The layer according to claim 12, wherein said ceramic bonding layer has a layer thickness of from 1–5 $\mu$m.

14. The layer according to claim 12, wherein said ceramic bonding layer has a layer thickness of approximately 2 $\mu$m.

15. The layer according to claim 1, wherein said foil is shaped into a honeycomb body having contact points prior to being coated, and at least some of said contact points are brazed.

16. A process for producing a honeycomb body, which comprises:
    oxidizing a foil formed of a steel composition containing aluminum to form a finely grained aluminum oxide layer on a surface;
    applying a ceramic washcoat acting as a bonding layer to the oxide layer; and
    applying a zeolite layer to the ceramic bonding layer.

17. The process according to claim 16, which comprises forming the steel foil with chromium.

18. A process for producing a metallic foil coated with zeolite, which comprises:
    oxidizing a foil formed of a steel composition containing aluminum to form a finely grained aluminum oxide layer on a surface;
    applying a ceramic washcoat acting as a bonding layer to the oxide layer; and
    applying a zeolite layer to the ceramic bonding layer.

19. The process according to claim 18, which comprises forming the foil of high-temperature-proof and corrosion-proof steel.

20. The process according to claim 18, which comprises forming the foil of high-temperature-proof and corrosion-proof steel containing more than 3.5% aluminum and more than 15% chromium.

21. The process according to claim 18, which comprises forming the foil of high-temperature-proof and corrosion-proof steel containing approximately 5% aluminum and approximately 20% chromium.

22. The process according to claim 18, which comprises shaping the foil into a honeycomb body prior to coating, and brazing at least some contact points resulting from the shaping.

23. The process according to claim 22, which comprises immersion coating the honeycomb body with at least one of a bonding layer and a zeolite layer, and then removing excess quantities of coating material present in cells of the honeycomb body by centrifuging the honeycomb body.

24. The process according to claim 22, which comprises applying a zeolite proportion of at least 30 g/m$^2$ of carrier surface area to the honeycomb body.

25. The process according to claim 18, which comprises producing a finely grained aluminum oxide layer with only slight proportions of chromium oxide and iron oxide on the foil.

26. The process according to claim 25, which comprises forming the oxide layer by annealing treatment for multiple hours at a temperature of from 900° to 1000° C. in an atmosphere.

27. The process according to claim 25, which comprises forming the oxide layer by annealing treatment for multiple hours at a temperature of 950° C. in an atmosphere.

28. The process according to claim 18, which comprises producing a finely grained aluminum oxide layer with only slight proportions of chromium oxide and iron oxide on the foil by slow annealing in an atmosphere.

29. The process according to claim 18, which comprises applying the ceramic bonding layer based on aluminum oxide by a sol-gel immersion process, and forming the ceramic bonding layer substantially of $\gamma$-Al$_2$O$_3$.

30. The process according to claim 29, which comprises applying the ceramic bonding layer in the form of an aluminum oxide sol.

31. The process according to claim 29, which comprises applying the ceramic bonding layer in the form of an aluminum oxide sol with a solid content of approximately 10%.

32. The process according to claim 29, which comprises calcining the ceramic bonding layer after the immersion process for approximately 3 hours at a temperature of 500° C. to 650° C.

33. The process according to claim 29, which comprises calcining the ceramic bonding layer after the immersion process for approximately 3 hours at a temperature of 550° C.

34. The process according to claim 18, which comprises applying the zeolite layer by a sol-gel immersion process, and adding from 10% to 30% by mass of aluminum oxide to zeolite material.

35. The process according to claim 18, which comprises applying the zeolite layer by a sol-gel immersion process, and adding 20% by mass of aluminum oxide to zeolite material.

36. The process according to claim 18, which comprises binding the zeolite to be applied in a ceramic matrix by grinding for multiple hours in a colloid mill.

37. The process according to claim 36, which comprises forming the matrix of an aluminum oxide-based sol.

38. The process according to claim 18, which comprises applying the zeolite in an $NH_4^+$ or $H^+$ form to be produced by ion exchange.

39. The process according to claim 18, which comprises forming the steel foil with chromium.

40. A zeolite-coated honeycomb body, comprising:
- a foil being formed of a steel composition containing at least one of chromium and aluminum and having a surface;
- an oxide layer covering said surface, said oxide layer being a finely grained aluminum oxide layer with at most slight proportions of chromium oxide and iron oxide, and
- said oxide layer having a mean surface roughness of 2 to 4 $\mu$m, and an averaged peak-to-valley height of at least 0.2 $\mu$m; and
- a ceramic washcoat on said oxide layer; and
- a zeolite layer disposed on said ceramic washcoat wherein said ceramic washcoat being a bonding layer for receiving said zeolite layer.

* * * * *